United States Patent
Rosenfeld

(10) Patent No.: US 9,856,834 B2
(45) Date of Patent: Jan. 2, 2018

(54) FILTER PRE-CLEANER SYSTEM

(71) Applicant: Caterpillar Inc., Peoria, IL (US)

(72) Inventor: Mark Rosenfeld, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 278 days.

(21) Appl. No.: 14/720,573

(22) Filed: May 22, 2015

(65) Prior Publication Data

US 2016/0341158 A1    Nov. 24, 2016

(51) Int. Cl.

| | |
|---|---|
| *F02M 35/08* | (2006.01) |
| *B01D 50/00* | (2006.01) |
| *B01D 45/12* | (2006.01) |
| *B01D 46/00* | (2006.01) |
| *F02M 35/16* | (2006.01) |
| *F02M 35/04* | (2006.01) |
| *F02M 35/10* | (2006.01) |

(52) U.S. Cl.
CPC .......... *F02M 35/086* (2013.01); *B01D 45/12* (2013.01); *B01D 46/0065* (2013.01); *B01D 50/002* (2013.01); *F02M 35/04* (2013.01); *F02M 35/048* (2013.01); *F02M 35/10013* (2013.01); *F02M 35/164* (2013.01); *Y02T 10/146* (2013.01)

(58) Field of Classification Search
CPC ........ B01D 46/00; B01D 50/00; B01D 35/12; B01D 9/00; B01D 46/04; B01D 46/42
USPC ...... 55/289, 290, 324, 296, 353, 446, 385.1, 55/486, 385.3; 95/290, 273; 96/190, 96/199; 425/74, 75; 454/61
See application file for complete search history.

(56) References Cited

U.S. PATENT DOCUMENTS

| | | | |
|---|---|---|---|
| 6,464,761 B1 | 10/2002 | Bugli | |
| 6,736,871 B1 | 5/2004 | Green et al. | |
| 7,531,029 B2 | 5/2009 | Hoke et al. | |
| 8,683,970 B2* | 4/2014 | Chlystek | F02M 35/0226 123/184.21 |
| 2002/0088208 A1* | 7/2002 | Lukac | A01B 51/026 55/289 |
| 2008/0016833 A1* | 1/2008 | Sheidler | B01D 46/0046 55/385.3 |
| 2008/0086989 A1* | 4/2008 | Sheidler | B01D 45/12 55/345 |
| 2009/0211208 A1* | 8/2009 | Johnson | B01D 46/0065 55/291 |
| 2014/0102483 A1 | 4/2014 | Hong et al. | |
| 2014/0165513 A1 | 6/2014 | Oelpke | |
| 2014/0260129 A1* | 9/2014 | Rosenfeld | F02M 35/0215 55/385.1 |

(Continued)

FOREIGN PATENT DOCUMENTS

| | | |
|---|---|---|
| CN | 102808682 A | 12/2012 |
| DE | 102011107730 A1 | 1/2013 |

(Continued)

*Primary Examiner* — Duane Smith
*Assistant Examiner* — Minh-Chau Pham
(74) *Attorney, Agent, or Firm* — Bart A. Fisher

(57) ABSTRACT

A pre-filter includes a first stage, a second stage, and a third stage. The first stage includes a first stage screen, a brush disposed against the first stage screen, and an actuator to move the brush and the first stage screen relative to one another. The second stage includes a centrifugal separator. The third stage includes a filter media having pores of a predetermined size.

5 Claims, 5 Drawing Sheets

(56) References Cited

U.S. PATENT DOCUMENTS

2014/0295923 A1* 10/2014 Vergote ................ A01D 45/10
460/98

FOREIGN PATENT DOCUMENTS

EP    102012023856 A1    6/2014
WO     20140210534 A1   12/2014

* cited by examiner

FILTER PRE-CLEANER SYSTEM

TECHNICAL FIELD

The present disclosure relates generally to filter systems and, more particularly, to a pre-cleaner for a filter system.

BACKGROUND

Machines used in the farming, construction, mining, power generation, and other like industries commonly include a frame that supports an internal combustion engine, a work tool movably connected to the frame, and at least one hydraulic cylinder connected between the frame and the work tool and driven by the engine. Such machines typically operate in harsh environments characterized by large amounts of airborne dust, dirt, and debris. In such environments, it is desirable to remove such debris from the air before directing the air to the engine. To assist with this process, such machines typically include an intake air filter or other like air cleaner configured to remove airborne debris upstream of the engine. Further, to assist in prolonging the useful life of such air cleaners, some machines may also include a pre-cleaner configured to remove relatively large debris from the intake air stream prior to cleaning the intake air with the air cleaner.

An exemplary air intake system employing a pre-cleaner is disclosed in U.S. Pat. No. 8,177,872 ("the '872 patent"), issued May 15, 2012. The pre-cleaner taught in the '872 patent includes a plurality of inertial separators disposed within a housing that is fluidly connected upstream of an engine air cleaner. As intake air is drawn into the housing, the inertial separators remove relatively large debris particles from the air and deposit them within the housing. These particles are then removed from the housing via a scavenge pipe fluidly connected to the exhaust system of the engine.

While the system of the '872 patent may be configured to remove relatively large debris particles from intake air, such systems are known to have several drawbacks. For example, in relatively high-debris environments, the inertial separators used in such systems are easily clogged. Once clogged, such separators can be difficult to clean due to their size, location, and configuration. Additionally, as such separators become clogged, air flow through the pre-cleaner is reduced. If left unchecked, this reduction in air flow can create an area of low pressure within the pre-cleaner strong enough to draw high temperature exhaust into the pre-cleaner. Such high temperature exhaust can damage the pre-cleaner and can have unwanted effects on the combustion process within the engine.

Moreover, scavenge pipes of the type disclosed in the '872 patent often have difficulty removing debris that has been collected within the pre-cleaner housing. Since the vacuum flow through such scavenge pipes is typically dictated by engine speed, the debris removal capabilities of such scavenge pipes can be significantly reduced at engine idle or other modes of engine operation characterized by relatively low engine speed. As a result, collected debris can accumulate within the housing over time. Due to the number and close proximity of inertial separators employed by such pre-cleaners, operators may have difficulty manually removing such accumulated debris from the pre-cleaner housing, and this built-up debris can reduce the efficiency of the pre-cleaner.

Accordingly, there is a need for improved pre-cleaner systems to address the problems described above and/or problems posed by other conventional approaches.

SUMMARY

Aspects of the disclosure are capable of providing improved pre-cleaning.

An aspect of the disclosure pertains to a pre-filter. The pre-filter includes a first stage, a second stage, and a third stage. The first stage includes a first stage screen, a brush disposed against the first stage screen, and an actuator to move the brush and the first stage screen relative to one another. The second stage includes a centrifugal separator. The third stage includes a filter media having pores of a predetermined size.

Another aspect of the disclosure relates to a machine. The machine includes an engine, an intake for the engine, and a pre-filter fluidly coupled to the intake. The pre-filter includes a first stage, a second stage, and a third stage. The first stage includes a first stage screen, a brush, and an actuator. The first stage screen is configured to filter a first portion of particles suspended in a flow of air out of the flow of air. The brush is configured to remove the first portion of particles from the first stage screen. The actuator is configured to move the brush and the first stage screen relative to one another. The second stage includes a centrifugal separator configured to urge the flow of air to rotate. The rotation of the air urges a second portion of particles suspended in the flow of air to move radially outwardly from a centerline of the rotating flow of air and exit the centrifugal separator via an annular debris port disposed about the centrifugal separator. The third stage includes a filter media having pores of a predetermined size to remove a third portion of the particles. The third portion of the particles is larger than the predetermined size.

Yet another aspect of the disclosure pertains to a pre-filter. The pre-filter includes a first stage, a second stage, and a third stage. The first stage includes a first stage centrifugal separator configured to filter a first portion of particles suspended in a flow of air out of the flow of air, the first stage centrifugal separator including a first stage inlet, a first stage cylindrical housing, a plurality of first stage vanes configured to urge the flow of air to rotate within the first stage cylindrical housing, a first stage annular debris port, and a first stage outlet. The flow of air enters the first stage inlet and is rotated in response to passing through the plurality of first stage vanes. The first portion of particles are accelerated radially outwardly from a first stage centerline and are expelled via the first stage annular debris port and the flow of air exits via the first stage outlet. The second stage includes a plurality of second stage centrifugal separators. Each second stage centrifugal separator is configured to urge the flow of air to rotate. Rotation of the air urges a second portion of particles suspended in the flow of air to move radially outwardly from a centerline of the rotating flow of air and exit the centrifugal separator via a respective second stage annular debris port disposed about the centrifugal separator. The third stage includes a filter media having pores of a predetermined size to remove a third portion of the particles. The third portion of the particles are larger than the predetermined size.

It will be understood that the disclosure is not limited in its application to the details of construction and to the arrangements of the components set forth in the following description or illustrated in the drawings. The disclosed device and method are capable of aspects in addition to those described and of being practiced and carried out in various ways. Also, it will be understood that the terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various aspects. Therefore, the claims will be regarded as including such equivalent constructions insofar as they do not depart from the spirit and scope of the various aspects.

The drawings presented are intended solely for the purpose of illustration and therefore, are neither desired nor intended to limit the subject matter of the disclosure to any or all of the exact details of construction shown, except insofar as they may be deemed essential to the claims.

DETAILED DESCRIPTION

Figure 1:
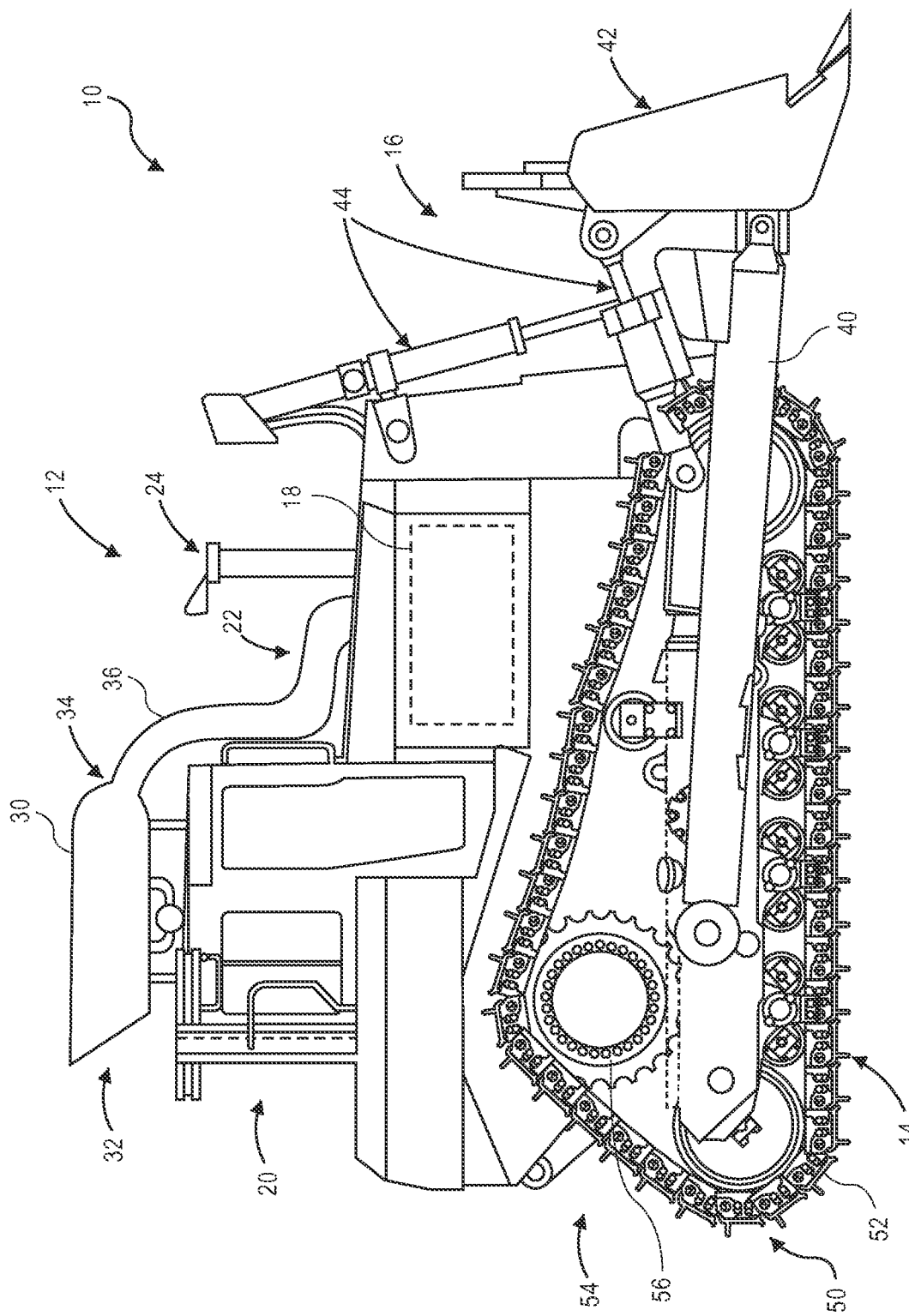
FIG. 1 shows an exemplary machine with a pre-filter system according to an aspect of the disclosure.

FIG. 1 illustrates an exemplary machine 10 having various systems and components that cooperate to accomplish a task. The machine 10 may embody a fixed or mobile machine that performs some type of operation associated with an industry such as mining, construction, farming, transportation, or another industry known in the art. For example, the machine 10 may be an earth moving machine such as an excavator or a power shovel, a dozer, a loader, a backhoe, a motor grader, a dump truck, or another earth moving machine.

Referring to FIG. 1, the machine 10 may include a body 12 movable upon a drive system 14 and an implement system 16. The body 12 includes a power source 18 and a cabin 20. The power source 18 may include a combustion engine such as, for example, a reciprocating compression ignition engine, a reciprocating spark ignition engine, a combustion turbine, or another type of combustion engine known in the art. It is contemplated that the power source 18 may alternatively include a non-combustion source of power such as a fuel cell, a power storage device, or another power source known in the art. The power source 18 may produce a mechanical or electrical power output that may then be converted to hydraulic power for moving the actuators of the drive system 14 and/or the implement system 16. The power source 18 may include an air intake 22 and an exhaust 24.

The air intake 22 may include a pre-filter 30. The pre-filter 30 includes an inlet 32 and outlet 34. The inlet 32 is configured to receive a flow of air from the atmosphere. The outlet 34 is in fluid communication with the air intake 22 via a conduit 36, for example. The pre-filter 30 is configured to filter a flow of air prior to the flow of air entering the air intake 22. In order to reduce the amount of debris entering the inlet 32, the inlet 32 may be disposed at a position of minimal debris. In the particular example shown, the inlet 32 is disposed above the cabin 20 and facing a rear portion of the machine 10. However, in other examples, the inlet 32 may be disposed above or below the cabin 20, facing forward, to another side, or downward and/or may be more forward or rearward on the machine 10.

The implement system 16 includes an arm 40 pivotally coupled to the body 12 and a work tool 42. A set of actuators 44 are configured to move the work tool 42 in response to commands from an operator in the cabin 20. In other examples, the set of actuators 44 and/or the drive system 14 may be autonomously or remotely controlled. According to an exemplary aspect of the disclosure, the set of actuators 44 are double-acting cylinders, configured to receive hydraulic fluid on both ends of the respective pistons. Additional actuators (e.g., electric or hydraulic motors) may be used to propel the machine 10 via the drive system 14.

Numerous different work tools 42 may be attached to the machine 10 and controlled by an operator. The work tool 42 may include any device used to perform a particular task such as, for example, a blade (shown in FIG. 1), a fork arrangement, a bucket, a shovel, a ripper, a dump bed, a broom, a snow blower, a propelling device, a cutting device, a grasping device, or any other task-performing device known in the art. Although the aspect illustrated in FIG. 1 shows the work tool 42 configured to pivot in the vertical direction relative to the body 12, it will be appreciated that the work tool 42 may alternatively or additionally rotate relative to the implement system 16, slide, open and close, or move in any other manner known in the art.

The drive system 14 may include one or more traction devices powered to propel the machine 10. As illustrated in FIG. 1, the drive system 14 may include a left track 50 (not shown) located on one side of the machine 10, and a right track 52 located on an opposing side of the machine 10. The left track 50 may be driven by a left travel final drive 54 (not shown), and the right track 52 may be driven by a right travel final drive 56. It is contemplated that the drive system 14 could alternatively include traction devices other than tracks, such as wheels, belts, or other known traction devices. The machine 10 may be steered by generating a speed and/or rotational direction difference between the left travel final drive 54 and the right travel final drive 56, while straight travel may be effected by generating substantially equal output speeds and rotational directions of the left travel final drive 54 and the right travel final drive 56.

Figure 2:
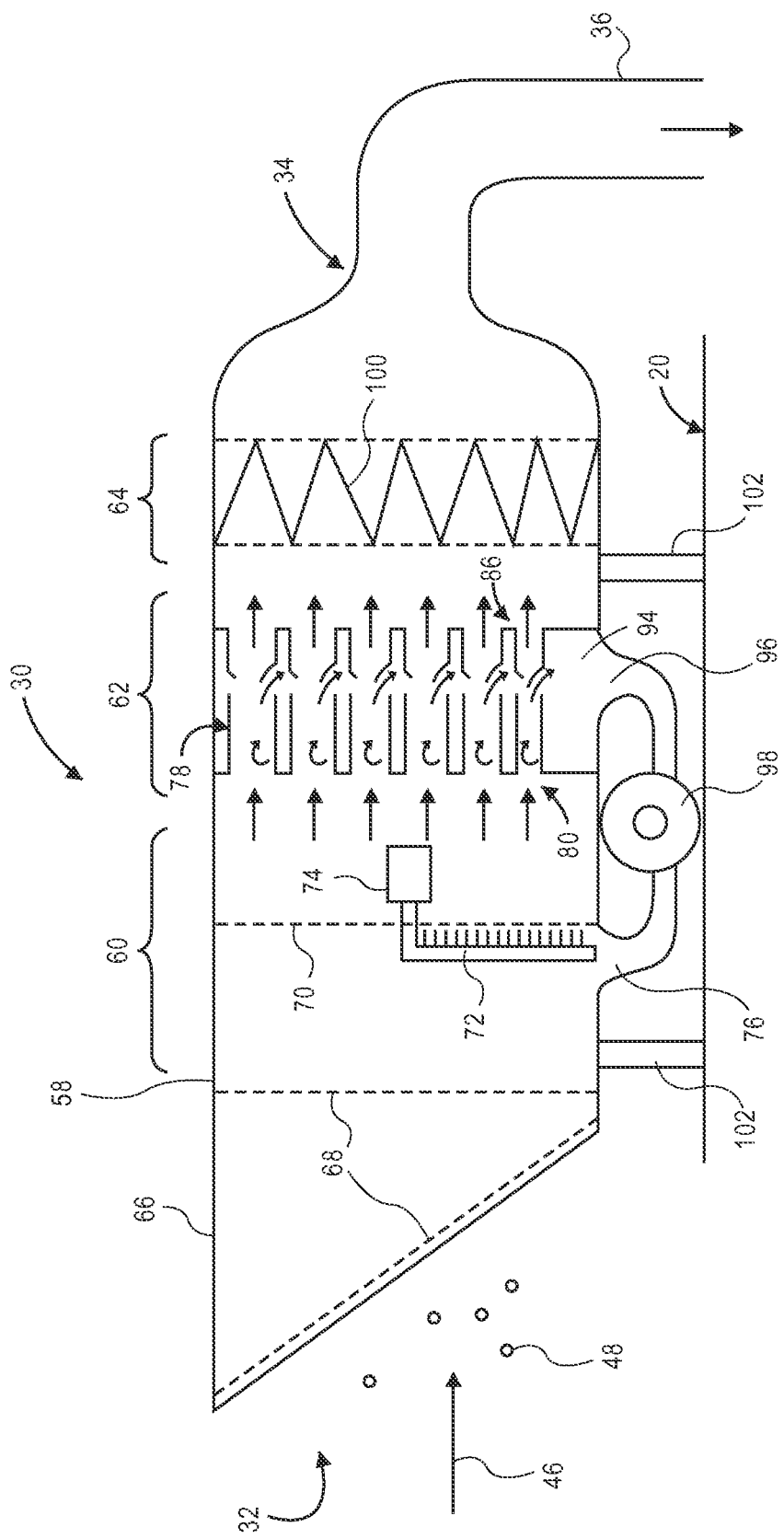
FIG. 2 shows the pre-filter system according to an aspect of the disclosure.

FIG. 2 shows the pre-filter 30 according to an aspect of the disclosure. As shown in FIG. 2, the pre-filter 30 includes a housing 58, a first stage 60, a second stage 62, and a third stage 64. In general, a flow of air 46 entering the pre-filter 30 includes suspended particles 48 or debris or various sizes and at each stage increment, progressively finer particles are removed. In a particular example, the first stage 60 may be configured to remove particle>50 micrometers (μm), the second stage 62 may be configured to remove particles>10 μm, and the third stage 64 may be configured to remove particles>5 μm. Of note, the particle sizes mentioned are by way of example and only provided to illustrate the progressively finer sized particles being filtered at each stage.

Optionally, the pre-filter 30 includes a hood 66 and/or a coarse screen 68. If included, the hood 66 is configured to shield the inlet 32 from rain and/or large debris such as plant matter, paper, foam, and other trash that may be present in the work environment. If included, the coarse screen 68 may be configured to prevent or reduce the ingress of large debris greater than about 1 square centimeter and animals. If included with the optional hood 66, the coarse screen 68 may be disposed at an angle parallel to an opening of the hood 66.

The first stage 60 includes a screen 70 and brush 72. The screen 70 and the brush 72 are configured to move relative to one another via an actuator 74 such as a motor. In various examples, the screen 70 and the brush 72 may move in a sweeping, oscillating, side to side, rotating and/or other such movement relative to one another. In a particular example, the actuator 74 is a brushless, direct current (dc) electrical motor that is configured to rotate either the screen 70 or the brush 72. For example, the brush 72 and the actuator 74 may be mounted to the housing 58, the screen 70 may be mounted to a rotating member of the actuator 74 and the screen 70 may rotate relative to the brush 72 in response to rotation of the actuator 74. Alternatively, the screen 70 and the actuator 74 may be mounted to the housing 58, the brush 72 may be mounted to a rotating member of the actuator 74, and the brush 72 may rotate relative to the screen 70 in response to rotation of the actuator 74. Debris cleared from the screen 70 via the brush 72 may be collected by a first stage debris port 76 configured to provide an egress for the collected debris.

Figure 5:
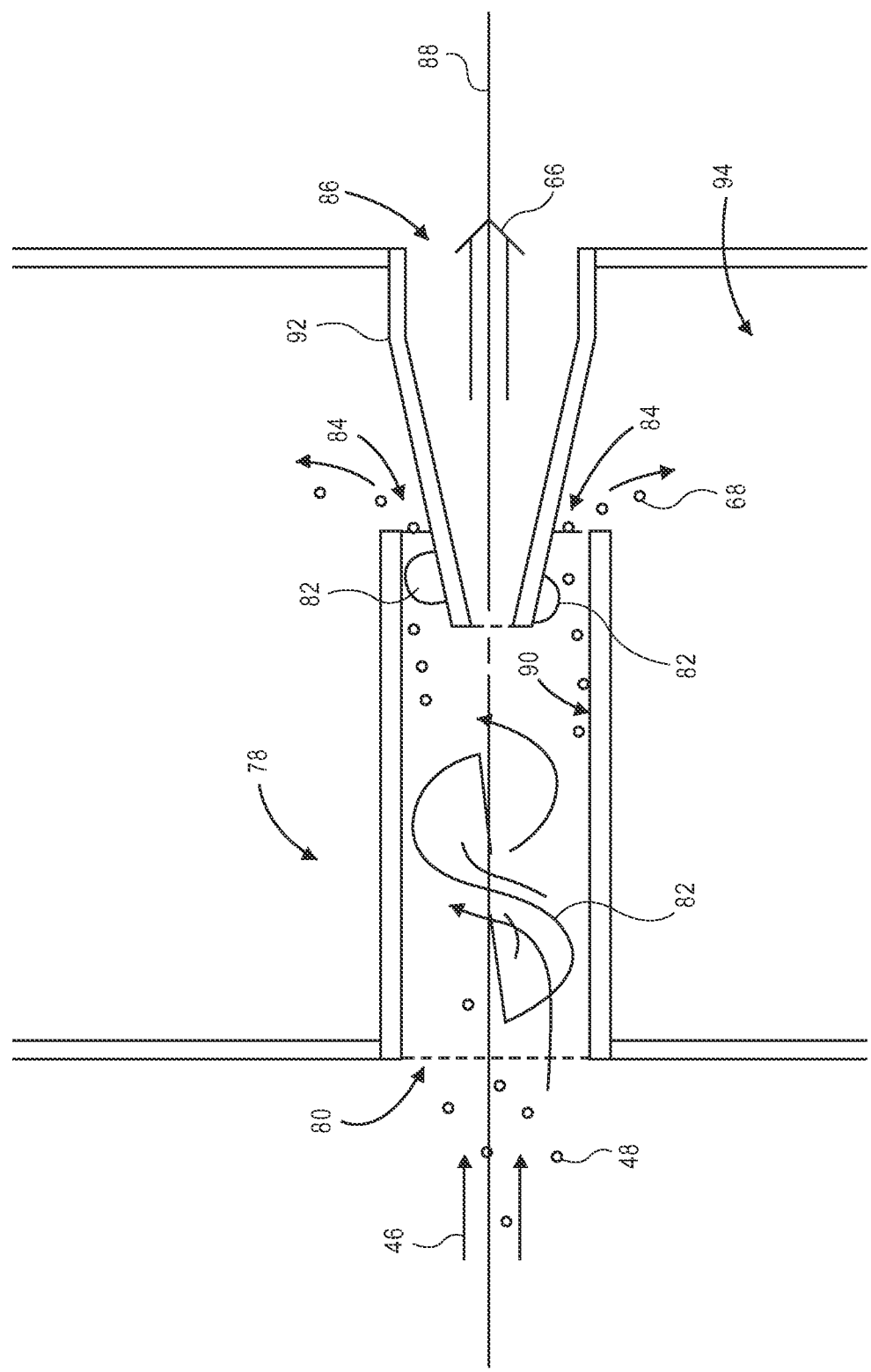
FIG. 5 shows a cross sectional view of a centrifugal separator suitable for use with the pre-filter system according to an aspect of the disclosure.

The second stage 62 includes one or more centrifugal separators 78. As shown more clearly in FIG. 5, each centrifugal separator 78 includes a second stage inlet 80, one or more vanes 82, an annular debris port 84, and a second stage outlet 86. As the flow of air 46 enters the centrifugal separator 78, the air and any entrained particles 48 are urged to rotate in response to flowing past or through the vanes 82. This rotation accelerates the particles 48 radially outwardly from a center line 88 and up against an inside wall 90 of the centrifugal separator 78. As the particles 48 continue to be carried forward by the flow of air 46, the particles 48 exit via the annular debris port 84. Optionally, in or near the annular debris port 84, additional vanes 82 may be disposed to further urge the flow of air 46 to rotate. The second stage outlet 86 is fluidly connected to a tapered portion or cone 92 configured to fit within the inside wall 90. The cone 92 is configured to draw a portion of the flow of air 46 that is proximal to the center line 88. This portion of the flow of air 46 that is proximal to the center line 88 includes less of the particles 48 in response to the particles 48 being removed via the annular debris port 84. The particles 48 removed via the annular debris port 84 are configured to enter a second stage debris chamber 94.

Returning to FIG. 2, the second stage debris chamber 94 is in fluid communication with a second stage debris port 96 that is configured to collect the particles 48 that enter the second stage debris chamber 94. Optionally, the pre-filter 30 includes a blower 98 configured to generate a suction sufficient to draw the particles 48 that have collected at the first stage debris port 76 and/or the second stage debris port 96. If included, the blower 98 may be in fluid connection with the first stage debris port 76 and/or the second stage debris port 96 and may be powered via an electric motor or the like. In other examples, the blower 98 may be omitted and the debris may be configured to fall from the first stage debris port 76 and/or the second stage debris port 96.

The third stage 64 includes a filter media 100. As is generally known, the filter media 100 may be pleated or otherwise arranged to increase the surface area of the filter media 100. filter media 100 may include any suitable material for filtering air or other fluids. Examples of suitable materials include: paper or other natural material; spun, felted, or woven natural or man-made fibers; polymer foams; and the like. In a particular example, the filter media 100 includes a card stock of felted polyester fibers. This card stock can be cut, scored, folded and able to retain folds. In particular, the card stock of the filter media 100 is able to retain pleats folded therein. The third stage 64 is shown mounted within the pre-filter 30, however, in other examples, the third stage 64 may be disposed outside of the pre-filter 30. For example, the third stage 64 may be mounted closer to the ground on the machine 10 to facilitate ease of replacement. As is generally know, filter media is configured to includes pores of a particular size in order to filter out particles that are larger than the pore size. Depending on the application, the pores in the filter media 100 may be made larger or smaller. Typically, smaller pores decrease the flow rate of fluid across the filter media. As such, the size of the pores which corresponds to the size of the particles filtered from the fluid is determined based on the particular application. For an internal combustion engine, the predetermined size of the pores and particles may be about 5 μm. However, in other examples, the predetermined size may be from less than 0.5 μm to greater than 10 μm.

To mount the pre-filter 30 to the cabin 20, the pre-filter 30 may include one or more mounts 102. The mounts 102 or brackets may be releasably fastened to the pre-filter 30 to facilitate servicing and/or replacement. Alternatively, the pre-filter 30 may be directly mounted to the cabin 20 or other locations on the machine 10.

Figure 3:
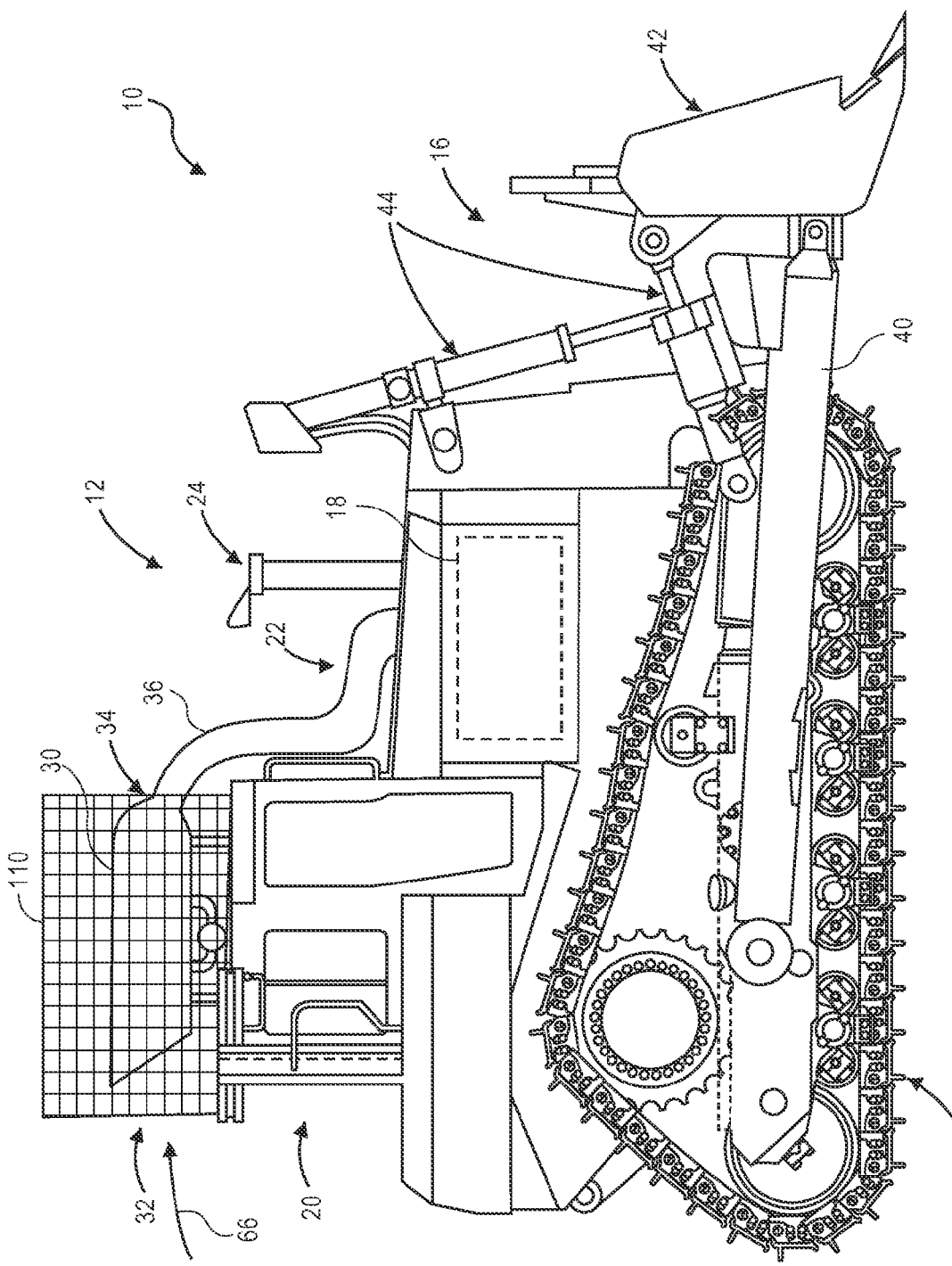
FIG. 3 shows the exemplary machine with the pre-filter system and an option cage according to an aspect of the disclosure.

FIG. 3 shows the exemplary machine with the pre-filter system and an optional cage 110 according to an aspect of the disclosure. As shown in FIG. 3, the optional cage 110 is disposed about the pre-filter 30 to protect the pre-filter 30 and further reduce occurrences of a blockage occurring at the inlet 32. For example, the cage 110 is configured to facilitate the flow of air 46 entering the inlet 32 even if covered by fabric, mattresses, or other such debris that may be found in landfills and other industrial work sites.

Figure 4:
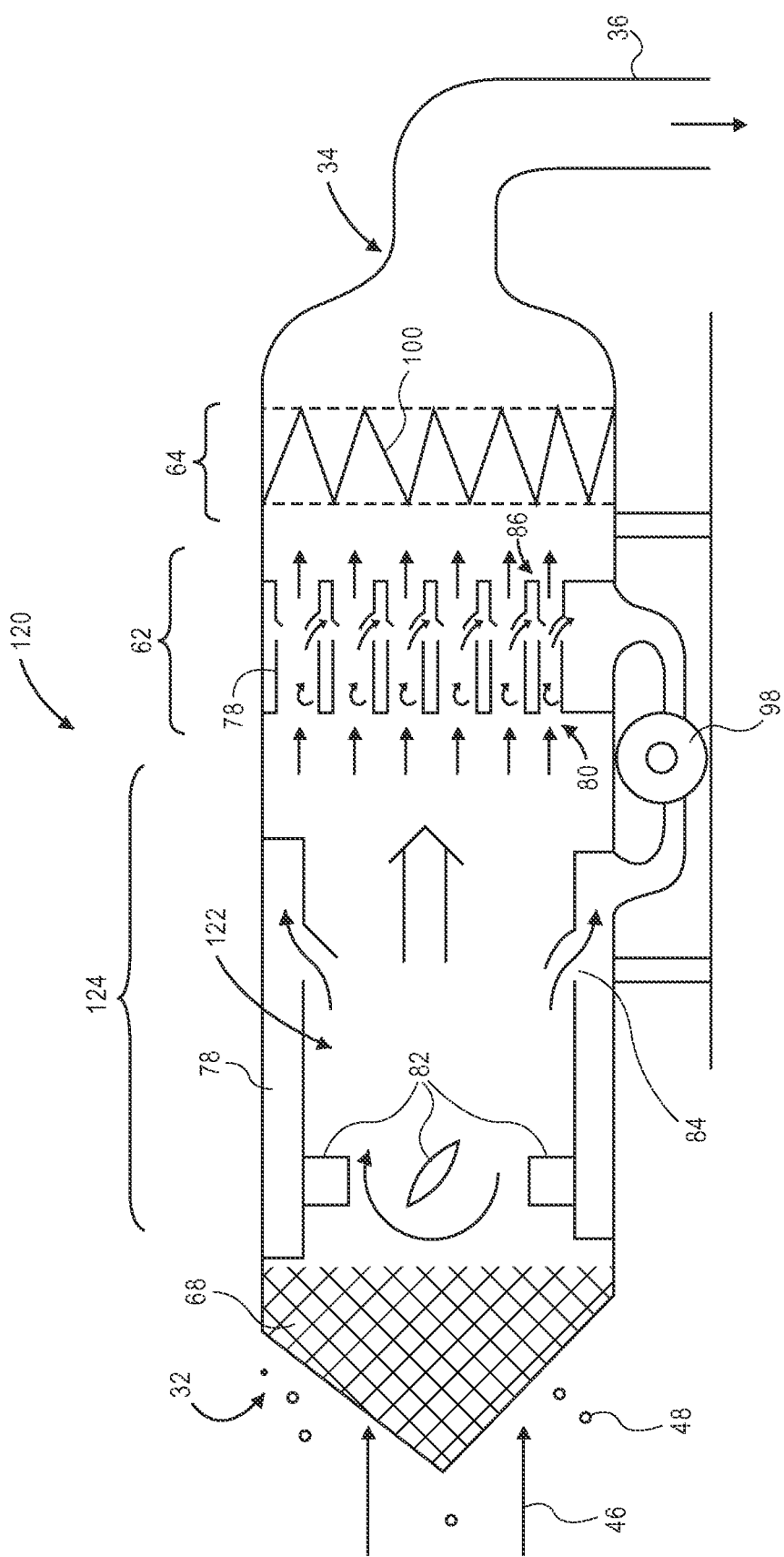
FIG. 4 shows a pre-filter system according to another aspect of the disclosure.

FIG. 4 shows a pre-filter 120 according to another aspect of the disclosure. The pre-filter 120 of this aspect is similar to the pre-filter 30 of the aspect shown in FIG. 2 and thus, for the sake of brevity, those elements already described will not be described again. As shown in FIG. 4, the pre-filter 120 of this aspect includes a centrifugal separator 122 in a first stage 124. Relative to the centrifugal separators 78 in the second stage 62, the centrifugal separator 122 in the first stage 124 is larger to facilitate the removal of the particles 48 that are larger than the particles 48 removed by the centrifugal separators 78 in the second stage 62. In the particular example shown, the centrifugal separator 122 in the first stage 124 is a single unit whereas the centrifugal separators 78 in the second stage 62 may include a dozen to several tens of individual centrifugal separators 78.

INDUSTRIAL APPLICABILITY

The present disclosure may be applicable to any machine in which particles are removed from a flow of air. Aspects of the disclosed pre-filter system and method may promote decreased maintenance, increased functionality, operationally flexibility, performance, and energy efficiency of filter systems and engine performance.

According to an aspect of the disclosure, with reference to FIGS. 1 and 2, the machine 10 is a bulldozer that may be operated in environments with a heavy burden of entrained airborne particles and flying debris that may reduce the performance of conventional air filtration systems. Examples of such environments include agricultural sites, landfills, and the like. In such environments it may be common to encounter debris having a surface area of greater than 10 square centimeters to greater than one square meter.

The pre-filter 30 and the pre-filter 120 described herein are configured to provide filtered air in such environments. Initially, by locating the pre-filter 30 and the pre-filter 120 at a high location with the inlet 32 directed toward the rear of the machine 10, the debris burden may be reduces because large debris tends to fall out of the air more quickly than smaller debris. In addition, the inlet 32 is relatively larger than the outlet 34 and the air intake 22. This larger face area of the inlet 32 facilitates a reduction of air velocity at the inlet 32. This reduced air velocity allows larger debris to fall away from the coarse screen 68 and reduces the amount of debris being held onto the coarse screen 68 by static pressure of the flowing air.

Once the particle laden air enters the pre-filter 30 and the pre-filter 120, the first stage 60 and the first stage 124 are configured to remove the particles 48 that are larger in size as compared to the remainder of the particles 48. Again, the particles 48 suspended in the air prior to entering the pre-filter 30 may vary in size. The first stage 60 and the first stage 124 are configured to remove the portion of the particles 48 that are largest in size. To filter these large particles, the first stage 60 and the first stage 124 include the screen 70 or the centrifugal separator 78, respectively. In the first stage 60, the brush 72 is configured to brush the particles 48 off the screen 70 and the brushed off particles exit the pre-filter 30 via the first stage debris port 76. In the first stage 124, again the larger of the particles 48 are drawn from the flow of air 46 via the annular debris port 84 in response to the rotating flow of air in the first stage 124. This rotation of the air is induced by the vanes 82.

Thereafter, the flow of air 46 that has been filtered by the first stage 60 and the first stage 124 continues to the second stage 62. The second stage 62 includes a plurality of the centrifugal separators 78. In various examples, the second stage 62 may include 10 to several tens of the centrifugal separators 78 arrayed as a double plate or double wall with the second stage inlets forming openings in one wall and the second stage outlets 86 forming openings in the other wall. Within the centrifugal separators 78, the vanes 82 induce a rotation of the flow of air 46 that accelerates the particles 48 to the inside wall 90 and then out the annular debris port 84. Sufficient space is provided between the centrifugal separators 78 that the particles 48 fall down and collect in the second stage debris port 96.

In order to prevent outside air from entering the pre-filter 30 and the pre-filter 120 and to facilitate the removal of the particles from the first stage debris port 76 and the second stage debris port 96, the blower 98 may be fluidly connected to the first stage debris port 76 and the second stage debris port 96 and configured to generate an outward flow of exhaust air to convey the collected particles 48 out of the pre-filter 30 and the pre-filter 120.

The flow of air 46 then passes through the third stage 64 where the smaller particles are removed. It is an advantage of this multi-stage system that the life of the filter media 100 is extended by the removal of the larger particle at the first stage 60 and second stage 62.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified.

I claim:

1. A pre-filter comprising:
   a first stage including:
   a first stage screen;
   a brush disposed against the first stage screen;
   an actuator to move the brush and the first stage screen relative to one another; and
   a first stage debris port in fluid communication with the first stage of the pre-filter;
   a second stage including:
   a centrifugal separator; and
   a second stage debris port in fluid communication with the second stage of the pre-filter; and
   a third stage including:
   a filter media having pores of a predetermined size; and
   a powered debris port blower in fluid communication with the first stage debris port and the second stage debris port, the debris port blower configured to generate an outward flow of exhaust air to convey collected particles out of the pre-filter.

2. The pre-filter according to claim 1 further comprising:
   a cage disposed about the pre-filter.

3. The pre-filter according to claim 1 further comprising:
   a hood extending from an intake of the pre-filter.

4. The pre-filter according to claim 1 wherein the actuator is affixed to the brush and configured to rotate the brush about the first stage screen.

5. The pre-filter according to claim 1 wherein the actuator is affixed to the first stage screen and configured to rotate the first stage screen.

* * * * *